United States Patent [19]

Taylor et al.

[11] 4,224,821

[45] Sep. 30, 1980

[54] APPARATUS AND METHOD FOR SENSING THE QUALITY OF DEWATERED SLUDGE

[75] Inventors: Lauren P. Taylor, Swarthmore; Alex Petroski, Springfield, both of Pa.

[73] Assignee: LRS Research Ltd., Broomall, Pa.

[21] Appl. No.: 38,690

[22] Filed: May 14, 1979

Related U.S. Application Data

[63] Continuation-in-part of Ser. No. 885,683, Mar. 13, 1978, Pat. No. 4,159,248, which is a continuation-in-part of Ser. No. 812,483, Jul. 5, 1977, Pat. No. 4,160,734, which is a continuation of Ser. No. 709,566, Jul. 26, 1976, Pat. No. 4,040,960.

[51] Int. Cl.$^3$ .................................................. G01G 9/36
[52] U.S. Cl. ................................... 73/32 R; 210/961
[58] Field of Search ................. 210/210, 96.1, 85, 86, 210/65, 66, 67; 73/32 A, 32 R

[56] References Cited

U.S. PATENT DOCUMENTS

| | | | |
|---|---|---|---|
| 2,490,452 | 12/1949 | Mason | 73/1 DV |
| 3,028,749 | 4/1962 | Welkowitz | 73/32 A |
| 3,220,261 | 11/1965 | Kriebel | 73/32 R |
| 3,368,387 | 2/1968 | Sion | 73/32 R |
| 3,796,658 | 3/1974 | Meissner, Sr. | 210/65 |
| 4,040,960 | 8/1977 | Taylor et al. | 210/96.1 |
| 4,159,248 | 6/1979 | Taylor et al. | 210/96.1 |

Primary Examiner—Benoît Castel
Attorney, Agent, or Firm—Woodcock, Washburn, Kurtz, Mackiewicz & Norris

[57] ABSTRACT

A cake sensor which includes a rotatable, hollow cylindrical shell adapted to be positioned within a flow of falling cake material and a piston within the shell. The shell has an opening therein through which the cake material will enter the shell, and to one end of the shell are connected a fluid source and a density sensor. The piston extends through the other end of the cylinder and is driven by a torque motor to compress cake material which falls into the cylinder through the opening. The various measurements developed by the density sensor, the torque developed by the torque motor, and the distance traveled by the piston are utilized to determine the characteristics of the cake material. A method for determining the quality of the cake material is also presented.

12 Claims, 3 Drawing Figures

APPARATUS AND METHOD FOR SENSING THE QUALITY OF DEWATERED SLUDGE

CROSS-REFERENCES TO RELATED APPLICATIONS

This application is a continuation-in-part application of Ser. No. 812,483, filed July 5, 1977, now U.S. Pat. No. 4,160,734, dated July 10, 1979 and entitled "CATCH BASIN APPARATUS AND METHOD," which is a continuation of application Ser. No. 709,566, filed July 26, 1976, now U.S. Pat. No. 4,040,960, dated Aug. 9, 1977 and entitled "CATCH BASIN PROCESSING APPARATUS." These applications are incorporated by reference as if specifically set forth herein.

This application is also a continuation-in-part of application Ser. No. 885,683, filed Mar. 13, 1978, now U.S. Pat. No. 4,159,248, dated June 26, 1979 and entitled "CATCH BASIN PROCESSING APPARATUS," which application is a continuation of the above-noted application 812,483. Application 885,683 is also incorporated by reference as if specifically set forth herein.

BACKGROUND OF THE INVENTION

The present invention relates to the handling of thick, viscous or thixotropic materials, and in particular to the reclamation from storage lagoons of dry, semidry or nearly gelatinous sludge produced as a by-product of various manufacturing operations and/or various conventional waste sludge sewage treatment processes. Most particularly, however, the invention relates to a cake sensor which determines the quality of the dewatered sludge removed from the lagoons by using as the criteria the desirability and suitability of the dewatered sludge for use as land fill material.

Although the actual chemical composition of the materials to be removed from catch basins or lagoons will vary from location to location, normally such materials have been deposited in a liquid or semiliquid state and have been stored in such lagoons or catch basins for a considerable period of time, and this storage results in the thickening of the material due to decreasing moisture contents. Moisture content may range from about 99.5% to as low as 60%, but commonly is in the range from about 92% to 85% after several years of aging in the lagoon. As described in U.S. Pat. No. 3,796,658, at this common moisture level the sludge does not behave as a fluid, but rather, resembles a heavy viscous or soft gelatinous material having thixotropic tendencies.

The problems which are connected in cleaning lagoons or catch basins of this type are aggravated by the fact that (depending upon the constituency of the waste products disposed therein) chemical reactions, microbic growth, local geologic characteristics including soil porosity and water table levels, and the particular design and contruction of the lagoon or catch basin to be cleaned result in extremely discontinuous deposits of materials to be removed. For example, depending on exposure, porosity, dwell time in the lagoon, the varying nature of the substances charged into the lagoon from year to year, and many other factors, the consistency and handleability of waste material to be removed from within any given lagoon, much less from one lagoon to the next, will vary markedly by depth and region.

The parent applications referenced above with regard to the present invention generally disclose novel catch basin cleaning systems wherein various means are provided for transferring material obtained from the catch basin to subsequent processing operations only in the event that the material is determined by various monitors to be of an optimal nature for introducing into the subsequent process phase. For example, a pumping means will transfer materials to an equalization means only if that material contains a preselected percentage of solids, which percentage is selected for its compatability with the subsequent processing means which are mounted on an adjacent mobile apparatus. Additional means are provided to insure that a maximum flow of material will be produced. For example, ejectors are used in combination with novel optimal pumping, monitoring and recirculation means in order to insure that the liquid which is collected from the catch basin has neither too little or too great a solids content for subsequent equalization and dewatering operations. In the event that a liquid is being pumped by the pumping means which contains the optimum solids content, this liquid is admitted to a subsequent equalization process which equalizes, mixes and homogenizes the collected material for subsequent treatment. Dewatering, treatment, conditioning and discharge follow equalization and interact to produce the desired end products which often may be a cake material suitable for use as land fill material. Water suitable for return to the process head or sanitary sewer may be produced. Alternatively, water may be recirculated to be added directly into either the ejector system or to dilute the material which is being collected by the pumping system.

Throughout these processes, material which is collected from the catch basin, hereafter referred to as the wash effluent or wash stream, is monitored qualitatively and quantitatively at numerous stages of the processes. By monitoring the nature and quantity of this flow, the level of the equalization means, the density of the dewatering means input, the centrate turbidity centrate flow rate and centrate pH, various valves are automatically operated which regulate the bypass of the wash effluent back into the catch basin, the flow of material to the equalization means, the flow of thickened material either to the conditioning means or again to the equalization means, the flow of material to the process head or ejector, the amount of virgin water added to the pumping means, and the rates of the pumping means, dewatering means, treatment (chemical feed) means and conditioning means. As a result, these prior applications present systems capable of adapting superior dewatering equipment to the art of catch basin cleaning which, heretofore, has relied upon settling tank type processing in order to collect and then transport materials removed from catch basins.

SUMMARY OF THE INVENTION

It is an object of the present invention to provide an improvement to the various prior art dewatering apparatuses which will determine and control the handling quality of the cake material obtained by dewatering the materials removed from the catch basins.

It is a further object of the present invention to provide a device which will measure the absence of stickiness, squashiness, mud-like character, viscosity, etc., which are known in the art to be of great importance in determining the desireability of using any particular substance in this case particularly the dewatered catch basin material as land-fill material.

These objects are achieved by the cake sensor of the present invention which includes a rotatable, hollow cylindrical shell adapted to be positioned within a flow of falling cake material and a piston within the shell. The shell has an opening therein through which the cake material will enter the shell, and to one end of the shell are connected a fluid source and a density sensor. The piston extends through the other end of the cylinder and is driven by a torque motor to compress cake material which falls into the cylinder through the opening. The various measurements developed by the density sensor, the torque developed by the torque motor, and the distance traveled by the piston are utilized to determine the characteristics of the cake material. This information is then used to adjust the cake material having the desired characteristics.

BRIEF DESCRIPTION OF THE DRAWINGS

The above specific and further objects of the present invention will become more apparent from the following detailed description taken in conjunction with the formal drawings, wherein.

DETAILED DESCRIPTION OF THE INVENTION

Figure 1:
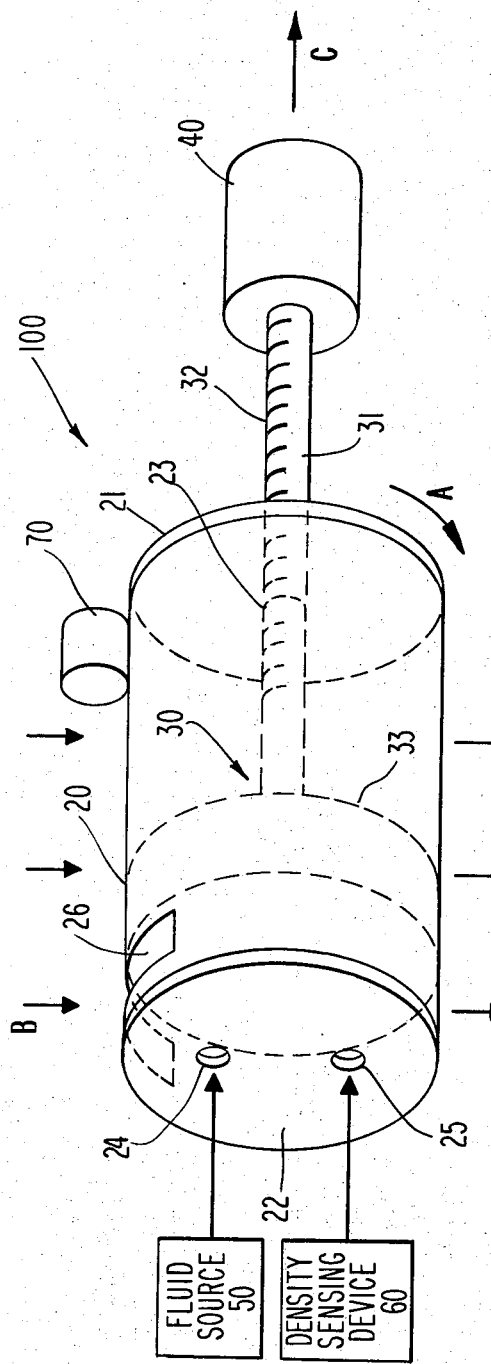
FIG. 1 is an isometric view of the cake sensor of the present invention showing the plunger thereinside.

Although specific forms of the invention have been selected for illustration in the drawings, and the following description is drawn in specific terms for the purpose of describing these forms of the invention, this description is not intended to limit the scope of the invention which is defined in the appended claims.

In the view of the preferred embodiment of the present invention as shown in FIG. 1, the cake sensor 100 is primarily a cylinder or hollow cylindrical shell 20 with a plunger or piston 30 movably fitted therein. The piston member has a piston head 33 within the cylinder and a piston rod 31 connected to the piston head which extends through one end 21 of the cylinder and is connected to a torque motor 40. The cylinder is preferably rotatable about its longitudinal axis, which coincides with the piston rod 31 of the piston 30, and the cylinder is sealed at both ends by plates 21 and 22. The cylinder is preferably designed to be rotatable; the end plates 21 and 22 are stationary.

The end plates 21, 22 both have openings therethrough which communicate with the interior of the cylinder. The piston rod 31 extends through an opening 23 in the first end plate 21, and the opposite end plate 22 has at least two openings, 24, 25 therethrough. The first of these two openings, 24, is adapted to have a fluid source 50 connected thereto, and the second opening 25 is designed to receive a density sensing device 60. The fluid source 50 provides a pressurized fluid, such as compressed air or a liquid, like water, under pressure. The density sensor 60 may be an ultrasonic transducer fitted into opening 25.

In addition to the two open ends which are sealed by the two plates 21, 22, the cylinder 20 has an additional opening 26 through the sidewall thereof. As will be discussed shortly, this sidewall opening 26 is specifically provided to admit cake material into the cylinder so that it can be tested.

When the sensor is being utilized, the cylinder preferably having a diameter of 3" to 5" is positioned in a flow stream of the cake material to be tested. The sensor is typically situated transverse to the flow direction of the cake as shown by arrows B with the sidewall opening 26 directed against the flow direction, so that the falling cake material will enter into the cylinder. During the time when the cake material is filling the cylinder, the piston 30 is retracted by the torque motor 40 toward the end plate 21. After the sample of cake is admitted into the cylinder, however, the torque motor is engaged to force the piston toward the second end plate 22 and, thus, compress the cake material between the piston and the second end plate. The movement of the piston toward the second end plate is continued until a predetermined amount of torque is attained; the limit of the torque applied to the piston may be determined by the stall characteristics of the motor. Or, as is specifically preferred, the torque may be controlled by logic circuitry, a computer, or a micro-processor which controls the functions of the torque motor 40, as well as the functions of the dewatering device with which the cake sensor is used. When the piston has moved as far as required in the compressing direction, the cylindrical shell 20 is rotated as shown by arrow A so that the opening is no longer in alignment with the cake flow; it rotated, for example, 90° by a turning motor 70 in contact with the cylinder. This rotation of the cylinder will prevent any further cake material from entering into the cylinder. Also, after the piston has moved to its fully compressed position and before the piston is retracted, the torque applied to the piston, the position of the piston with respect to the interior of the cylinder as detected by the indexer 32 mounted thereon, and the density of the compressed cake as sensed by the ultrasonic transducer are each recorded.

Since the cylinder shell has been rotated so that no more cake material may enter through the opening 26, the direction of the piston movement is reversed, i.e., toward the first end plate 21, and the torque applied by the torque motor is continuously recorded in order to subsequently chart or monitor the torque required to move the piston in the reverse direction away from the compressed cake as a function of time. Depending on the "stickiness" or "mud-like" character of the sample which has been collected and compressed within the cylinder, the torque applied by the motor in order to produce the movement of the piston will vary as the piston is retracted, and the stickiness of the sample will be reflected by the "hump", i.e., increases in torque required during the initial phases of the withdrawal process. Eventually, the torque required to withdraw the piston will assume a relatively constant level, whereupon the withdrawal away from the compressed cake will be completed and the collection of test data may be concluded.

Figure 2:
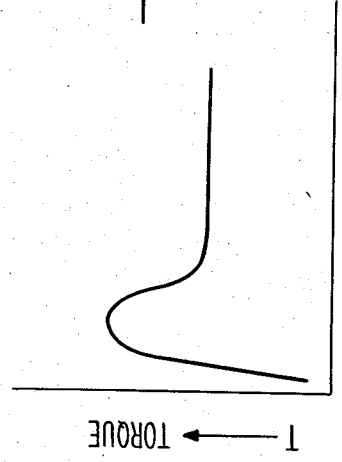
FIG. 2 is a graphical representation of the torque required to displace the piston during withdrawl of the piston from the compressed cake material.

A typical example of the type of relationship which exists between the torque T and the change in direction X of piston is shown in FIG. 2. It can be seen that the torque is zero when the cake is compressed and before the piston begins to be withdrawn. The torque, however, increases rapidly as the piston is withdrawn from the compressed cake as the piston attempts to overcome the "stickiness" of the compressed cake and its attraction for the piston. As the piston withdraws further, the stickiness is overcome and the required torque reduced until it levels off to a constant value.

After all of the required data is collected, the sample within the cylinder is removed so that further samplings can be made in order to maintain a continuous watch on the characteristics of the cake material. At this point, the piston should have been fully retracted away from the cake, and the cake should be able to communicate with the opening 26 in the cylinder. The cylinder shell is then, again, rotated, approximately 90°, so that the opening faces, preferably, in a downward position 180° from the initial position in which the cake material was admitted into the cylinder. Or, in other words, the opening process opens downwardly in the same direction as the cake flow. Once this position is attained, pressurized fluid, air or liquid, is injected into the cylinder through the opening 26 to break up the compressed cake and force the cake material from the cylinder. If the fluid is a liquid, it can also be used to wash the inside of the cylinder shell, and the wash fluid will empty through the opening.

After the cake material is exhausted from the cylinder, the piston is again forced all of the way to the left, against the second end plate, thereby closing the opening 26 in the cylinder, and the cylinder is rotated 180° so that the opening is in a position to receive the falling cake material when the piston is next retracted.

Even though a rotatable cylinder with stationary ends is disclosed in the preferred embodiment, it is within the scope of this invention to provide a structure wherein the end plates are affixed to the cylinder shell, and the fluid attachment and the attachment of the density sensor are flexibly connected to the end plate so that the end plate can rotate with the cylinder.

The motor 70 which is provided to rotate the cylinder 20 through the various required angles may be any motor which one skilled in the art might use to rotate the cylinder. Two examples might be a gear wheel connected to the motor which engages a geared portion around the circumference of the cylinder, or a resilient member, such as a rubber-like member, connected to the motor which rotates the cylinder due to engagement with the circumference thereof.

Furthermore, while it is felt that rotating the cylinder the initial 90° may adequately prevent further cake material from entering into the container, it is recognized that additional mechanical arrangements may be provided that will either slide over or in some way block the opening 26 to prevent further cake material from entering. These additional structures are also considered to be within the scope of this invention.

Figure 3:
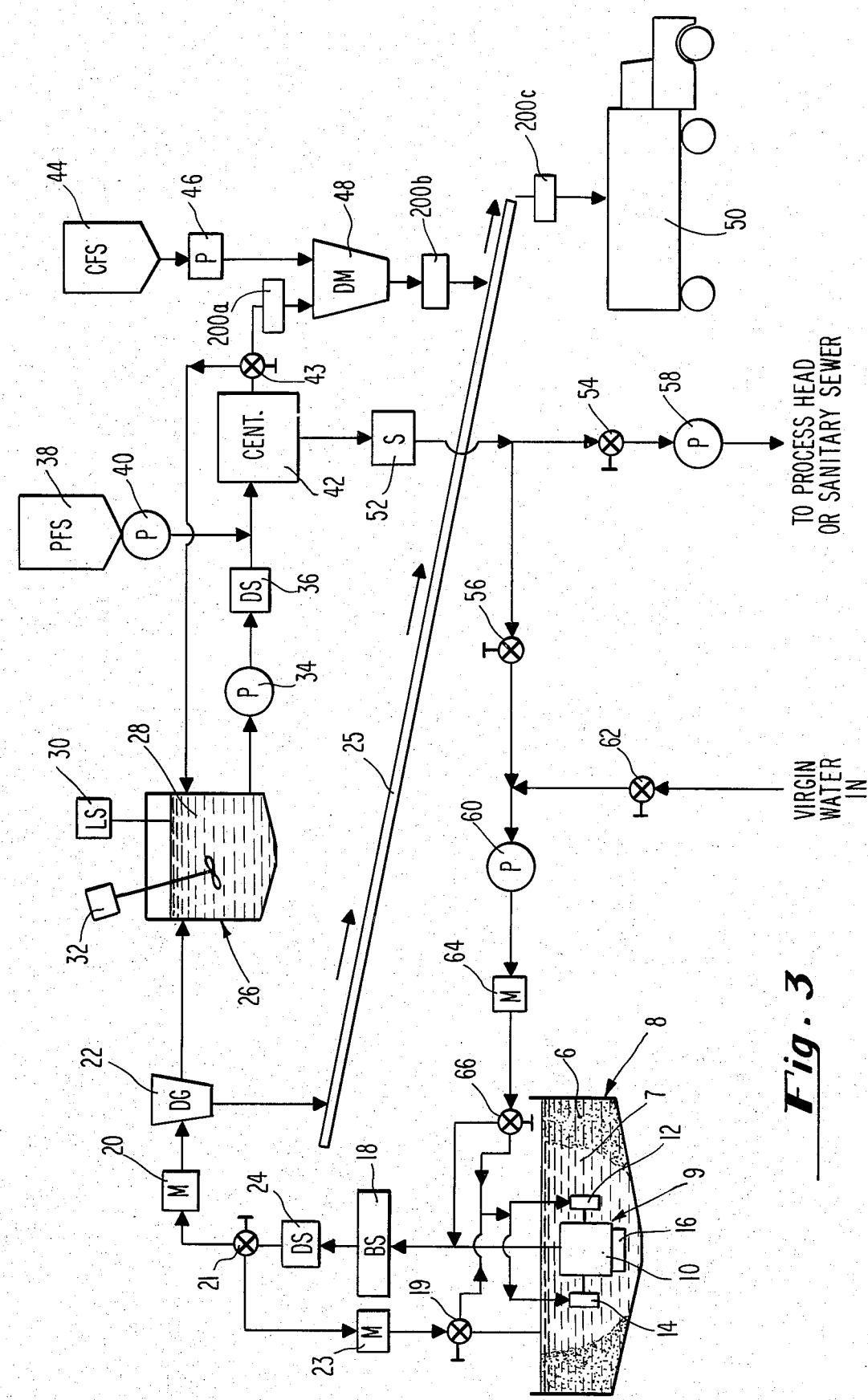
FIG. 3 is a schematic representation of a catch basin processing apparatus showing three possible incorporations of a cake sensing device thereinto.

As indicated previously, this invention is especially useful for determining and controlling the quality of cake material obtained by dewatering the material removed from catch basins which is intended for subsequent use as land fill material. FIG. 3 is a schematic representation of the apparatus and system which is presented in the applications cross-referenced and incorporated by reference herein. Since a complete explanation of the parent application is summarized in the background of this application and is fully discussed in detail in these incorporated applications, additional description is not presented herein, except as necessary to understand the incorporation of the present improvement into such an arrangement.

By the time the material being treated in the apparatus of FIG. 3 reaches the centrifuge 42, it is essentially in a form of cake material which, hopefully, has the required optimum density. If not, the shunt valve 43 operates to return the partially dewatered material to the equalization tank 26 for further processing.

When the dewatered cake material is finally processed to a stage where it is able to be removed after passing from the centrifuge, the quality of the material can easily be tested at that time by incorporating the cake sensor 200a of the present invention into the system as shown in FIG. 3. By installing the cake sensor 200a as shown, it is possible to take the data obtained regarding the cake material quality and feed it into the computerized or micro-processor control system regulating the system to adjust the various steps in the process and alter the production of the cake material as required to arrive at cake material having the desired characteristics.

It is further possible, as shown in FIG. 3, for the cake sensor to be incorporated into this system to test the quality of the material leaving the dry mixer 48. The dry mixer receives the dewatered cake material from the centrifuge along with cake conditioning feed system 44. This conditioning material, such as deodorizing and disinfecting materials, is added to the cake material in order to make the cake material more suitable for use in sanitary land fill situations. Again, the cake sensor 200b of the present invention may be positioned to test the quality of the material discharged from the dry mixer to determine its suitability for use as land fill material.

Finally, a cake sensor 200c of the type disclosed herein may also be positioned at the end of conveyor 25 to test the quality of the conditioned cake material emanating from the dry mixer and combined with the solids removed by the degritter 22 and carried toward the truck 50 by the grit conveyor 25. When the cake sensor 200c is so-positioned at the end of the process, then the quality of the final product of that apparatus for processing catch basin materials can easily be checked.

By incorporating this cake sensor into a catch basin material recovery system, the quality of the cake material produced by the system can be periodically tested so that the various steps in the process can be suitably adjusted in order to obtain a cake material having the desired characteristics in response to the test dates. Preferably, the overall sludge treating system will be automatic, that is, controlled by computer or microprocessor, so that adjustments to individual process steps will be automatically made by the system controls based on the data obtained from the cake sensor. It is, however, possible to take the measurements produced by the cake sensor manually adjust the various stages of the cake producing system in order to vary the quality of the cake material produced thereby.

It will be understood that various changes in the details, materials and arrangement of parts which have been herein described and illustrated in order to explain the nature of this invention may be made by those skilled in the art within the principle and scope of the invention as expressed in the following claims.

It will further be understood that the "Abstract of the Disclosure" set forth above is intended to provide a nonlegal technical statement of the contents of the disclosure in compliance with the Rules of Practice of the United States Patent and Trademark Office, and is not intended to limit the scope of the invention described and claimed herein.

What is claimed is:

1. A cake sensing apparatus comprising:

(a) cylinder means comprising a hollow cylindrical shell and having an opening for receiving a cake material therein, said cylinder means having a fluid source inlet connected thereto;
(b) piston means in said cylinder means for compressing against and withdrawing from material in said cylinder;
(c) density sensing means connected to said cylinder means for sensing the density of compressed cake material in said cylinder; and
(d) torque motor means connected to said piston means moving said piston means toward and away from cake material in said cylinder means and for determining the amount of torque required to move said piston means.

2. An apparatus as claimed in claim 1, wherein said cylinder means is comprised of:
first and second end plates sealing the two ends of said shell;
and wherein said opening is through the sidewall thereof.

3. An apparatus as claimed in claim 2, wherein:
(a) said second end plate has a first opening therethrough adapted to receive and communicate density sensing means with the interior of said cylindrical shell; and
(b) said second end plate has a second opening therethrough adapted to receive and communicate a fluid source with the interior of said cylindrical shell.

4. An apparatus as claimed in claim 2, wherein:
(a) said cylindrical shell is rotatable; and
(b) said end plates are stationary.

5. An apparatus as claimed in claim 4, further comprising motor means associated with said cylindrical shell for rotating said shell.

6. An apparatus as claimed in claim 2, wherein said piston means is comprised of:
(a) a piston head within said cylinder; and
(b) a piston rod connected to said piston head, extending through said first end plate, and connected to said torque motor means.

7. An apparatus as claimed in claim 6, wherein said piston rod has indexing markings thereon for determining the position of said piston rod within said cylinder means.

8. An apparatus as claimed in claim 2, wherein said density sensing means is an ultrasonic transducer.

9. A method of sensing the quality of dewatered sludge comprising the steps of:
(a) introducing and then compressing said dewatered sludge within a closed end hollow cylinder using a piston driven under a predetermined torque;
(b) sensing the density of said compressed, dewatered sludge; and
(c) withdrawing said piston from said compressed dewatered sludge and measuring as a function of time the distance moved by said piston and the torque required to retract said piston from said compressed dewatered sludge.

10. A method as claimed in claim 9, wherein said hollow cylinder has an opening through the sidewall thereof and said introducing is performed by positioning said opening; in a stream of falling dewatered sludge to receive the falling sludge through said opening.

11. A method as claimed in claim 10, further comprising the step of removing said compressed sludge from said cylinder through said opening after said piston is retracted therefrom using a fluid sprayed from the end of said cylinder opposite said piston.

12. A cake sensing apparatus comprising:
(a) cylinder means for receiving a cake material therein, said cylinder means having an opening adapted to have a fluid source connected thereto, said cylinder means being comprised of:
(i) a hollow cylindrical shell having at least one opening through the side wall thereof;
(ii) first and second end plates sealing the two ends of said shell;
(b) piston means in said cylinder means for compressing against and withdrawing from material in said cylinder, said piston means comprising:
(i) a piston head within said cylinder; and
(ii) a piston rod connected to said piston head, extending through said first end plate, and having indexing markings thereon for determine the position of said piston rod within said cylinder;
(c) density sensing means connected to said cylinder means for sensing the density of compressed cake material within said cylinder; and
(d) torque motor means connected to said piston means moving said piston means toward and away from cake material in said cylinder means and for determining the amount of torque required to move said piston means, said piston rod being connected to said torque motor means.

* * * * *